(12) United States Patent
Johnson et al.

(10) Patent No.: US 8,448,204 B2
(45) Date of Patent: May 21, 2013

(54) SYSTEM AND METHOD FOR AGGREGATING USER DATA AND TARGETING CONTENT

(75) Inventors: Erik Johnson, Pleasanton, CA (US); Carlos Teran, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 318 days.

(21) Appl. No.: 12/646,530

(22) Filed: Dec. 23, 2009

(65) Prior Publication Data

US 2011/0154400 A1   Jun. 23, 2011

(51) Int. Cl.
*H04H 60/33* (2008.01)

(52) U.S. Cl.
USPC .................. 725/13; 725/9; 725/40

(58) Field of Classification Search
USPC ................................ 725/9, 13, 46
See application file for complete search history.

(56) References Cited

U.S. PATENT DOCUMENTS

| | | | |
|---|---|---|---|
| 6,236,975 B1 | 5/2001 | Boe et al. | |
| 2001/0056391 A1* | 12/2001 | Schultz | 705/36 |
| 2002/0019746 A1* | 2/2002 | Rienhoff et al. | 705/2 |
| 2002/0124253 A1 | 9/2002 | Eyer et al. | |
| 2002/0161637 A1* | 10/2002 | Sugaya | 705/14 |
| 2004/0210661 A1 | 10/2004 | Thompson | |
| 2006/0235885 A1* | 10/2006 | Steele et al. | 707/104.1 |
| 2007/0150368 A1* | 6/2007 | Arora et al. | 705/26 |
| 2007/0224586 A1* | 9/2007 | Massie et al. | 434/350 |
| 2009/0186700 A1* | 7/2009 | Konkle | 463/42 |
| 2009/0249244 A1* | 10/2009 | Robinson et al. | 715/781 |
| 2010/0004940 A1* | 1/2010 | Choi et al. | 705/1 |
| 2010/0169157 A1* | 7/2010 | Muhonen et al. | 705/10 |
| 2010/0205541 A1* | 8/2010 | Rapaport et al. | 715/753 |
| 2010/0250556 A1* | 9/2010 | Park et al. | 707/749 |

* cited by examiner

*Primary Examiner* — Pankaj Kumar
*Assistant Examiner* — Sahar Baig
(74) *Attorney, Agent, or Firm* — Marc S. Kaufman; Stephen M. Hertzler; Reed Smith LLP (57) ABSTRACT

Systems and methods for aggregating user data and targeting content to users are described. User data is collected through quizzes and users are associated with a particular fictional or nonfictional character profile based on the user-submitted information. The user data associated with each character profile is aggregated to identify and recommend content for the user, such as television shows, news feed, web pages, promotions, advertisements, and the like. The invention can be used in connection with fan sites or other topic-specific sites that are associated with the character of the character profile.

24 Claims, 8 Drawing Sheets

SYSTEM AND METHOD FOR AGGREGATING USER DATA AND TARGETING CONTENT

BACKGROUND OF THE INVENTION

1. Field of the Invention

The present invention relates to a system and method for aggregating user data and targeting content to users.

2. Description of Related Art

Currently, some businesses rely on mass mailings, telemarketing, online banner ads, and other non-targeted advertising systems in order to reach potential customers. These techniques are generally ineffective, as they lack the ability to target specific consumers for specific products or services in which. Furthermore, these approaches require businesses to contact a wide range of customers without any knowledge as to the likelihood that any particular one would be interested in their specific product or service, wasting valuable advertising resources.

Alternatively, some businesses target potential customers based on user-submitted customer profiles. This is particularly known in the context of online content distribution. Conventional systems collect user information based on user-submitted information online and/or based on the online activity of the user. Currently existing profile-based systems require that a user fill out a questionnaire identifying their name, age, geographical locations, interests, etc. The system then makes generalizations about the user based on his or her completed questionnaire and/or online activities, and uses those generalizations in order target advertisements to the user.

Users are often reluctant to divulge their personal information or invest the time in submitting the information. Furthermore, there is no incentive for the user's cooperation or honesty in submitting information. Thus, these systems rely first and foremost on the user's willingness to complete the questionnaire, and second on the user's opinion and self-reporting, with uncertain reliability and validity.

Further, conventional media is converging with new online media. As an example, it is well known for have a fan site for a specific television show. Such sites have proven useful for generating "buzz" about the show, and creating a sense of community for the fans.

SUMMARY OF THE INVENTION

Thus, there is a need in the art for systems and methods for aggregating user data and targeting content to users that engages the user and provides incentive for sharing personal information. Also, there is a need to further leverage online content related to conventional content, such as fan websites for television shows. The present invention meets these needs and other needs by collecting information through quizzes and associating the user with a particular fictional or nonfictional character profile based on the user-submitted information. The user data associated with each character profile is aggregated to identify and recommend content for the user, such as television shows, news feed, web pages, promotions, advertisements, and the like. The invention can be used in connection with fan sites or other topic-specific sites that are associated with the character of the character profile.

One embodiment of the invention provides a method and system for aggregating user data and targeting content. The method preferably comprises sending a user-requested quiz associated with a character result to a user device, receiving user input associated with the quiz, assigning the user to a character result based on the received user input, aggregating user data associated with the user with a character profile associated with the character result, the character profile based on user data from a plurality of users associated with the character result, analyzing the character profile to identify content to target to users associated with the character profile, and delivering the identified content to the user. The system preferably comprises modules configured to carry out the steps of the method.

Delivering the identified content to the user may optionally comprise identifying television shows that users associated with the character profile are watching, determining the most popular shows for the character profile, and delivering a list of the most popular shows to the users associated with the character profile. Alternatively or additionally, delivering the identified content to the user may optionally comprise identifying common activities or interests for users associated with the character profile, determining the most popular activities or interests for the character profile, and delivering a list of the most popular activities or interests to the users associated with the character profile.

The identified content may optionally include one or more of user forums, web pages, news feeds, chat rooms, songs, advertisements, promotions, shops, and watch lists. The news feed may also optionally be delivered to the user.

Analyzing the character profile to identify content may optionally comprise analyzing user profiles of other users associated with the character profile. Alternatively or additionally, analyzing the character profile to identify content may optionally comprise analyzing activities of other users associated with the character profile.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A system and method for aggregating user data and targeting content to users is described. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement. In some instances, well-known structures and devices are shown in block diagram form in order to avoid unnecessarily obscuring the preferred embodiment.

Figure 1:
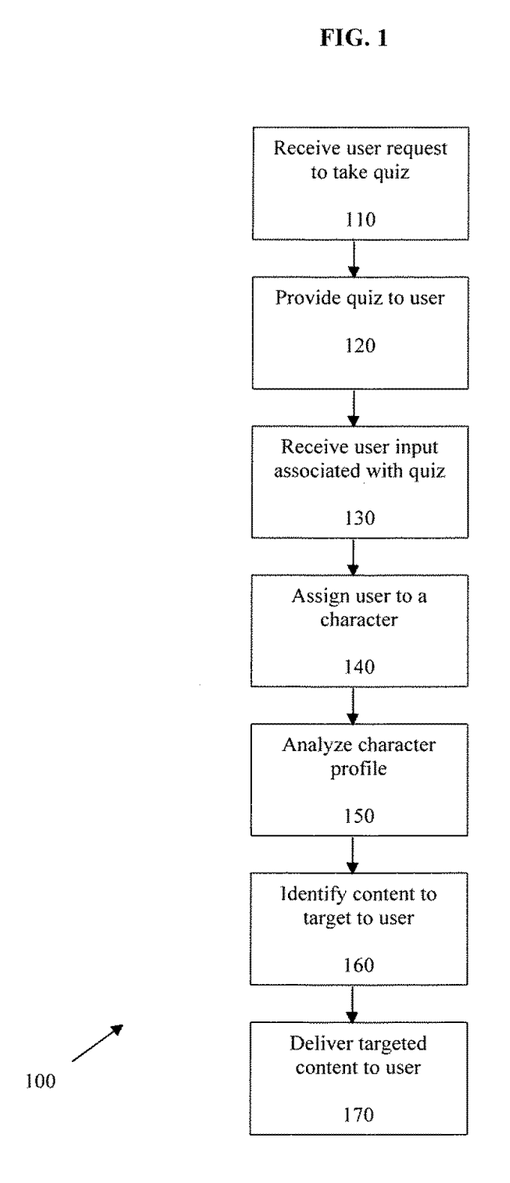
FIG. 1 is a flowchart illustrating a method according to one embodiment.

Referring now to the drawings, wherein like reference numerals designate identical or corresponding parts throughout the several views, FIG. 1 is a flowchart 100 illustrating a method according to one embodiment. At processing block 110, a user request to take a quiz is received, and at processing block 120, the quiz is provided to the user. The quiz may be, for example, a personality test with multiple questions used to match the user with a celebrity or character on a television show. At processing block 130, the user input associated with the quiz, including the user's answers to the quiz questions, is received. The user input may also include personal and/or demographic information, such as the user's name, location, age, and the like.

At processing block 140, the user is assigned to a celebrity or character based on his or her user input. For example, if the user is characterized as being courageous, strong, and likeable from the quiz, the user may be assigned to the hero of a popular television show. At processing block 150, the assigned character profile is analyzed to determine characteristics of the assigned character. In the same example, the profile of the hero may show that she is a young, adventurous woman who likes sports and traveling.

At processing block 160, content to target to the user is identified based on the assigned character and/or analyzed character profile. The content may be either directly or indirectly related to the assigned character. Direct character content may include a character web page, news feeds about the character, forums/chat rooms about the character, the character's theme song, and the like. Indirect character content may also be targeted to the user based on the analyzed character profile. Indirect character content may include television show web pages similar to the show the character is featured on, targeted advertisements or promotions based on the analyzed character profile, and the like. In the previous example, sports and traveling advertisements or promotions may be identified as being relevant to the user.

Furthermore, content may be identified to target to the user based on content of interest to users assigned to the same character. For example, if users assigned to a particular character typically listen to a certain type of music, a link to music or artist information associated with that type of music may be identified for other users assigned to that character. In another example, if users assigned to a particular character typically watch certain television shows, those television shows may be identified for other users assigned to that character. The identified television shows may also be presented as a "watch list" to other users, further indicating the dates, times, and channels of upcoming episodes of the television shows. At processing block 170, the targeted content is delivered to the user.

By targeting content to the user based on his or her quiz result relating him or her to a particular character, it is contemplated that the user is linked into more website content assets. With the user visiting a greater number of content assets, more user clicks are made on the website, increasing the amount of internet advertising revenue generated. Furthermore, the character and/or television show is further developed to the user, potentially increasing his or her interest in the show. It is contemplated that greater user interest in the character and/or television show will lead to greater dedication to the show, and greater likelihood that the user will tell others about the show. With more users watching the television show, greater advertising revenue may be generated for the television show as well. Increased user interest in the character and/or television show could also lead to greater product sales related to the character or show, such as, for example, the sales of character t-shirts, show DVDs, show soundtracks, and the like.

Figure 2:
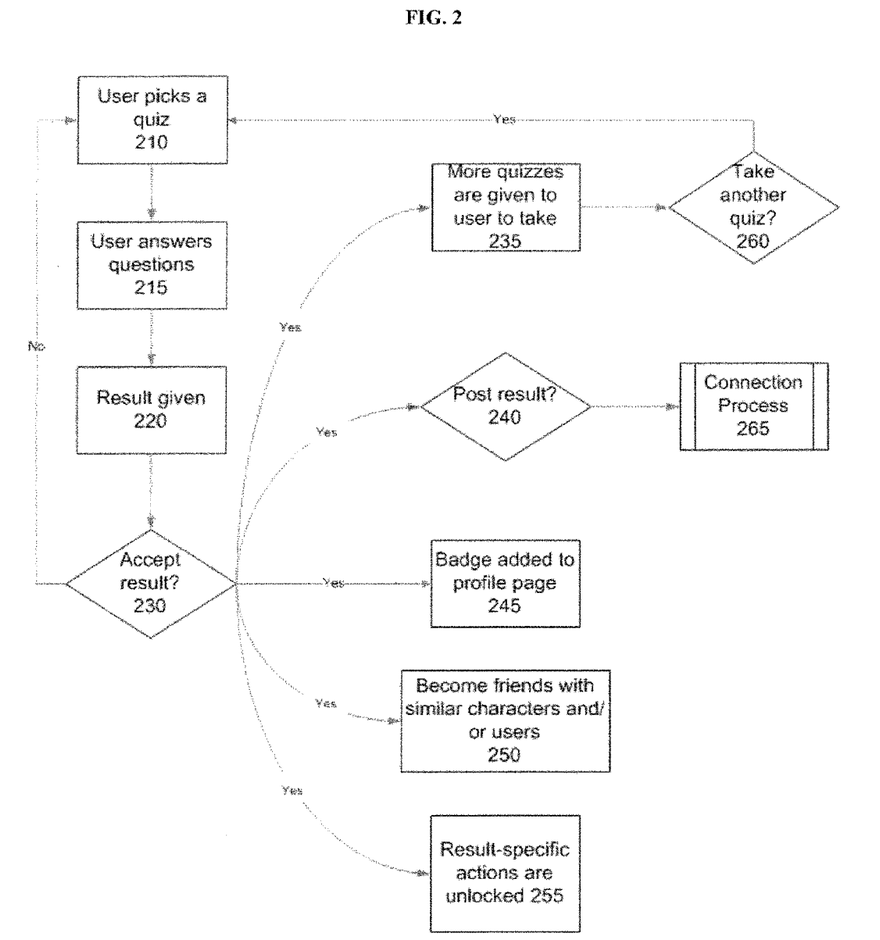
FIG. 2 is another flowchart illustrating a method according to one embodiment.

FIG. 2 shows another flowchart 200 illustrating a method according to an embodiment. At processing block 210, a user picks a quiz to take. The quiz may be on any subject, for example, "What TV character are you?", "Who's your TV girlfriend?", "What's your ride?", "What's your style?", and the like. At processing block 215, the user answers one or more questions, such as those shown in FIG. 3A and FIG. 3B, for example, in order to characterize the user according to the chosen quiz. At processing block 220, the result of the quiz is given to the user. At decision block 230, the user may either accept the result and move forward to one or more of blocks 235-255, or deny the result and restart the process at processing block 210.

If the user accepts the result at decision block 230, the user may be offered more quizzes to take at processing block 235. At decision block 260, if the user wishes to take another quiz, he or she is directed back to processing block 210 to select another quiz. Alternatively or additionally, if the user accepts the result at decision block 230, the user may post the result to a website, such as a social networking website, a blog, and the like, at decision block 240. If an external website is chosen to post the result to, the system may implement a connection process with that website in order to post the result at processing block 265. For example, if the user would like to post the results to Facebook™, a Facebook™ Connect process may be initiated.

Figure 5:
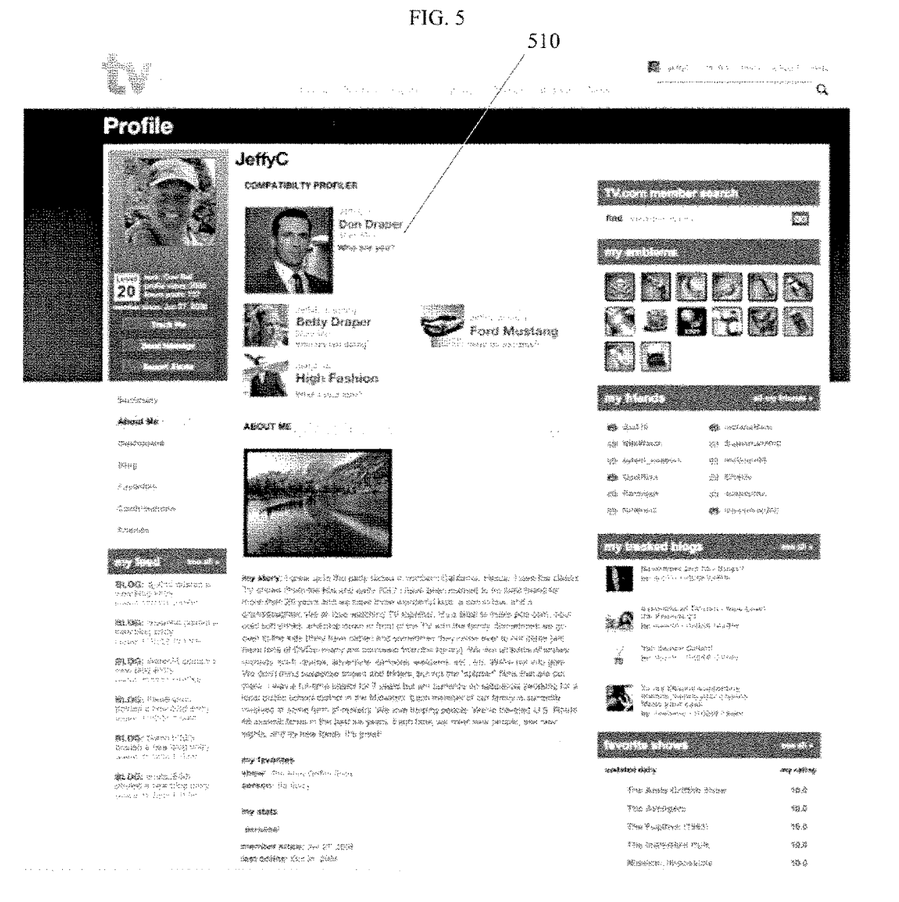
FIG. 5 is a screenshot of an exemplary results page of a system according to one embodiment integrated into a user profile.

Alternatively or additionally, if the user accepts the result at decision block 230, the user may select to have a badge with the result added to his or her profile page at processing block 245, and as shown and described with respect to FIG. 5. The user may select to become friends with other users, fictional or nonfictional, who received similar results at processing block 250. At processing block 255, result-specific actions may be unlocked for the user, such as a variety of "superpoke" actions. For example, if the user is matched to an affectionate character on a television show in the quiz, the result-specific "superpoke" actions may include a hug, a kiss, a tap, etc., of another user.

Figure 3A:
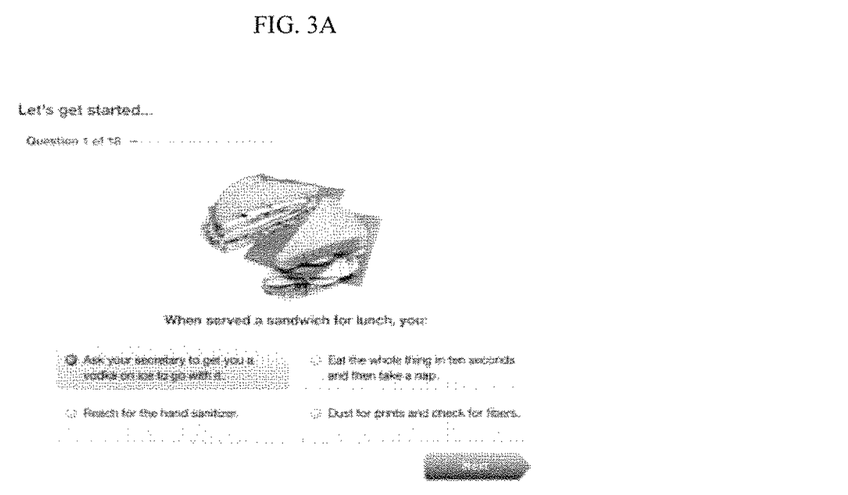
FIGS. 3A and 3B are screenshots of exemplary questions used for targeting content according to one embodiment.
Figure 3B:
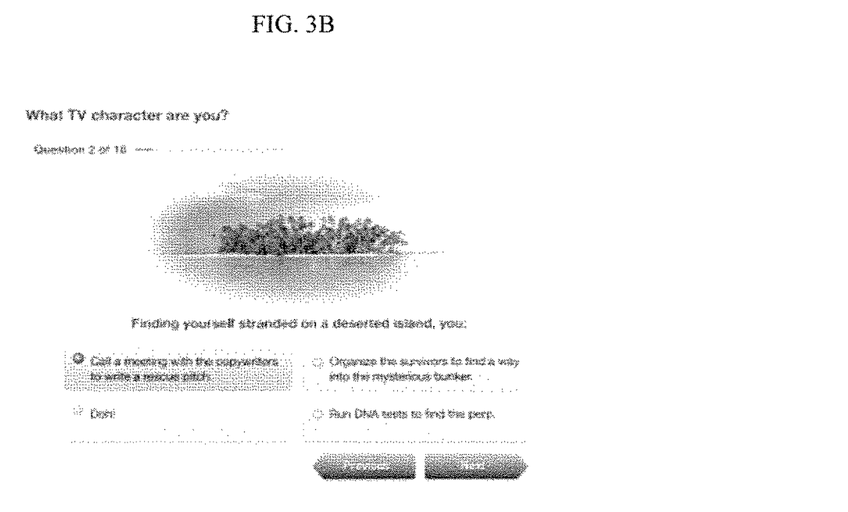

FIGS. 3A and 3B are screenshots of exemplary questions used for targeting content according to one embodiment. In these examples, the selected quiz may be, "What TV character are you?" The quiz presents questions with one or more answers designed to characterize the user and/or collect and aggregate information about the user. For example, in FIG. 3A, the user selects that when served a sandwich for lunch, he asks his secretary to get him a vodka on ice to go with it. Based on this answer, the system may match the user to a character that likes to drink alcoholic beverages, and has a high-powered job with a secretary. The system may also store information indicating that the user likes alcoholic beverages, in order to target information, advertisements, and the like, to the user at a later time.

Figure 4:
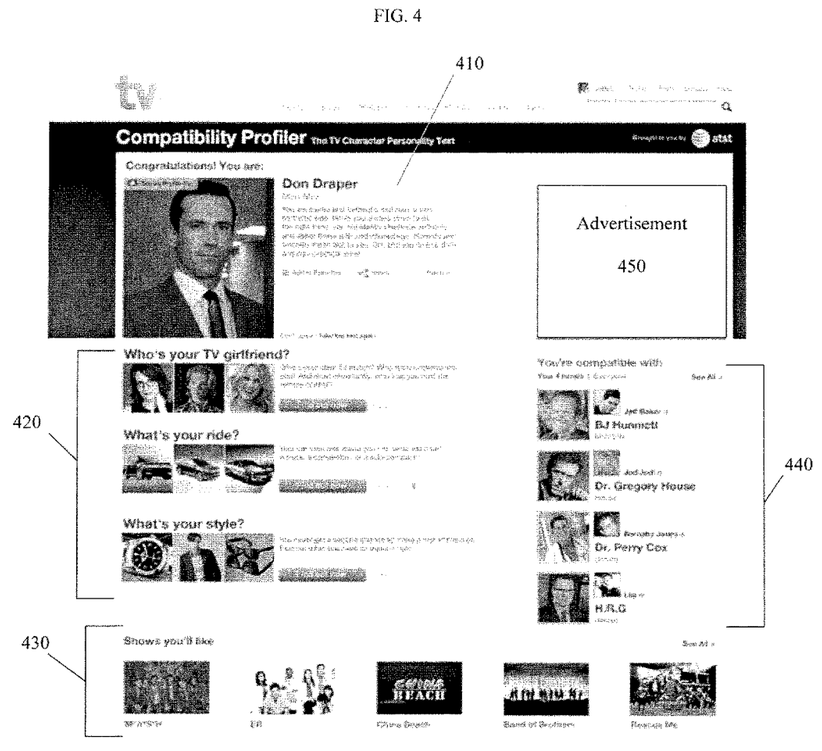
FIG. 4 is a screenshot of an exemplary results page of a system for aggregating user data and targeting content according to one embodiment.

FIG. 4 shows a screenshot of an exemplary results page of a system for aggregating user data and targeting content according to one embodiment. Results 410 from the quiz are displayed to the user upon completion of the quiz. In this example, the user has been identified as Don Draper from the TV show Mad Men. In addition to an identification of the result of the quiz, results 410 may also include a description of the result and picture of the result; in this case, a picture of Don Draper and a description of his character traits.

The system may also suggest one or more other quizzes 420 for the user to take upon completion of the quiz. In this case, the system suggests "Who's your TV girlfriend?", "What's your ride?", and "What's your style?", although any other quizzes may be suggested. The system may also suggest shows 430 in which the user might be interested and/or others users 440 that the user may be compatible with, based on results 410. Further, the system may provide advertisement 450, which may or may not be targeted to the user based on results 410, for example, or by any other method, such as the method described in U.S. patent application Ser. No. 12/559, 455, herein incorporated by reference in its entirety. Further, the system may have a social networking feature in which the quiz can be sent to persons connected to the user and/or recommended by the user.

FIG. 5 is a screenshot of an exemplary results page of a system according to one embodiment integrated into a user profile. As described previously with respect to FIG. 2. FIG. 5 shows badge 510 representing the results from the quiz integrated into the user's profile page.

Figure 6:
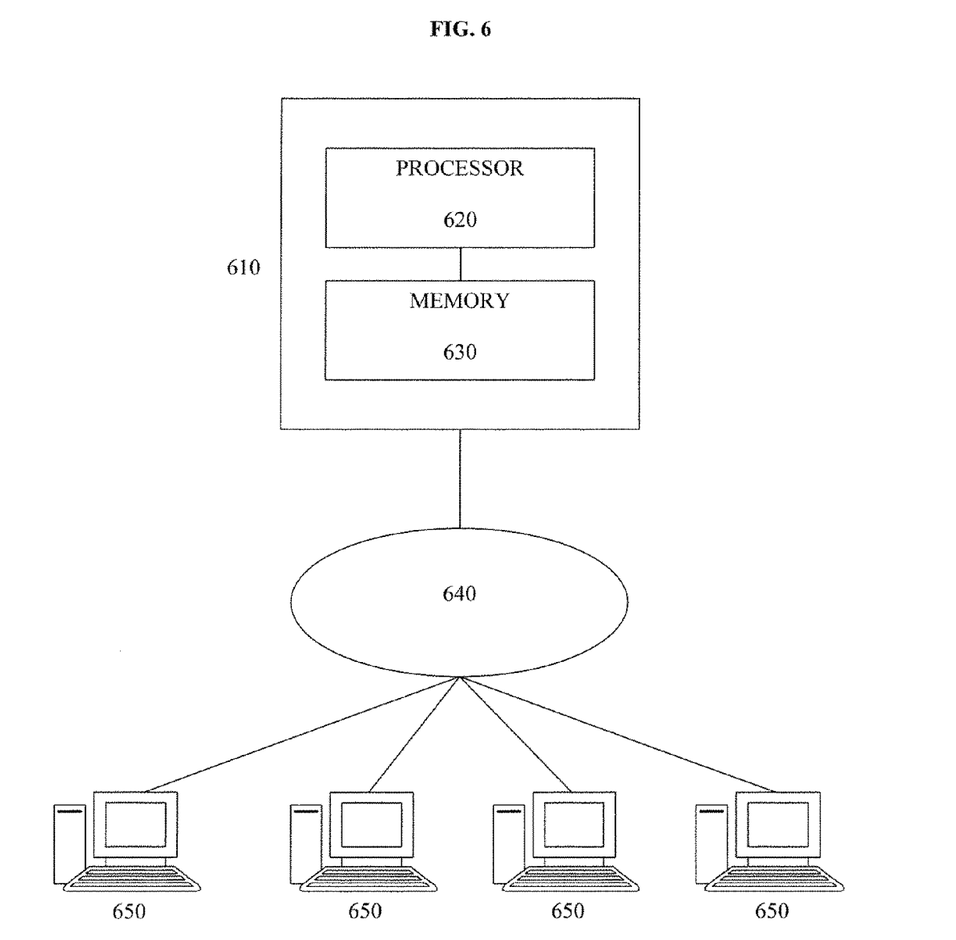
FIG. 6 is a schematic diagram of a system for aggregating user data and targeting content according to one embodiment of the invention.

FIG. 6 illustrates a system of an embodiment for effecting the functions described above. Server 610 that is connected over network 640 to a plurality of user systems 650. Server 610 includes processor 620 and memory 630, which are in communication with one another. Server 610 is configured to deliver online content to users at the plurality of user systems 650. Server 610 is typically a computer system, and may be an HTTP (Hypertext Transfer Protocol) server, such as an Apache server. Server 610 may be built using a combined LAMP or other solution stack. Memory 630 may be any type of storage media that may be volatile or non-volatile memory that includes, for example, read-only memory (ROM), random access memory (RAM), magnetic disk storage media, optical storage media, flash memory devices, and zip drives. Network 640 may be a local area network (LAN), wide area network (WAN), a telephone network, such as the Public Switched Telephone Network (PSTN), an intranet, the Internet, or combinations thereof. The plurality of user systems 650 may be mainframes, minicomputers, personal computers, laptops, personal digital assistants (PDAs), cell phones, netbooks, thin clients, and other computing devices. The plurality of user systems 650 are characterized in that they are capable of being connected to network 640. The plurality of user systems 650 typically include web browsers.

In use, when a user of one of the plurality of user systems 650 wants to, for example, take a quiz as described above, a request to access content is communicated to server 610 over network 640. For example, a signal is transmitted from one of the user systems 650, the signal having a destination address (e.g., address representing the server), a request (e.g., content request), and a return address (e.g., address representing the user system that initiated the request). Processor 620 accesses memory 630 to provide the requested content, which is communicated to the user over network 640. For example, another signal may be transmitted that includes a destination address corresponding to the return address of the client system, and the content responsive to the request.

Figure 7:
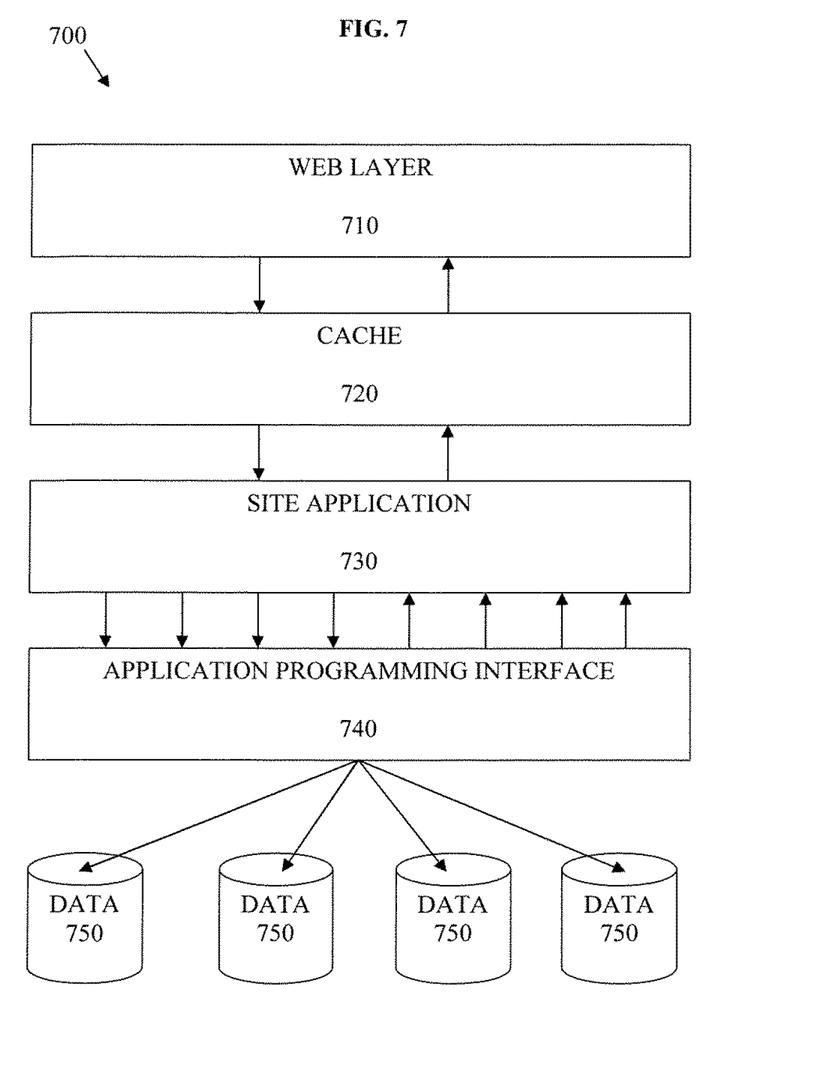
FIG. 7 is a block diagram of an architecture for aggregating user data and targeting content according to one embodiment of the invention.

As shown in FIG. 7, system architecture 700 includes web layer 710, cache 720, site application 730, application programming interface 740, and a plurality of data stores 750. It will be appreciated that the system architecture may vary from the illustrated architecture. For example, web layer 710 may directly access data stores 750, the site application may directly access data stores 750, system architecture 700 may not include cache 720, etc., as will be appreciated by those skilled in the art. Web layer 710 is configured to receive user requests, for example, to take a quiz, through a web browser and return content that is responsive to the user request. Web layer 710 communicates the user requests to cache 720. Cache 720 is configured to temporarily store content that is accessed frequently by web layer 710 and can be rapidly accessed by web layer 710. In one embodiment, cache 720 may be a caching proxy server. Cache 720 communicates the user requests to site application 730.

Site application 730 is configured to update cache 720 and to process user requests received from web layer 719. Site application 730 may identify that the user request is for a page that includes data from multiple sources. Site application 730 can then convert the page request into a request for content from multiple sources and transmits these requests to application programming interface 740. Application programming interface 740 is configured to simultaneously access data from the plurality of data stores 750 to collect the data responsive to the plurality of requests from site application 730. The plurality of data stores 750 may include, for example, data about different characters, content to target to users, and the like. It will be appreciated that in alternative embodiments only one data store 750 may be provided to store the data.

The data in data stores 750 is provided to application programming interface 740, which provides the content to site application 730. Site application 730 updates cache 720 and delivers the cached content in combination with the accessed content to web layer 710, which delivers browsable content to the user, such as through a quiz page.

Figure 8:
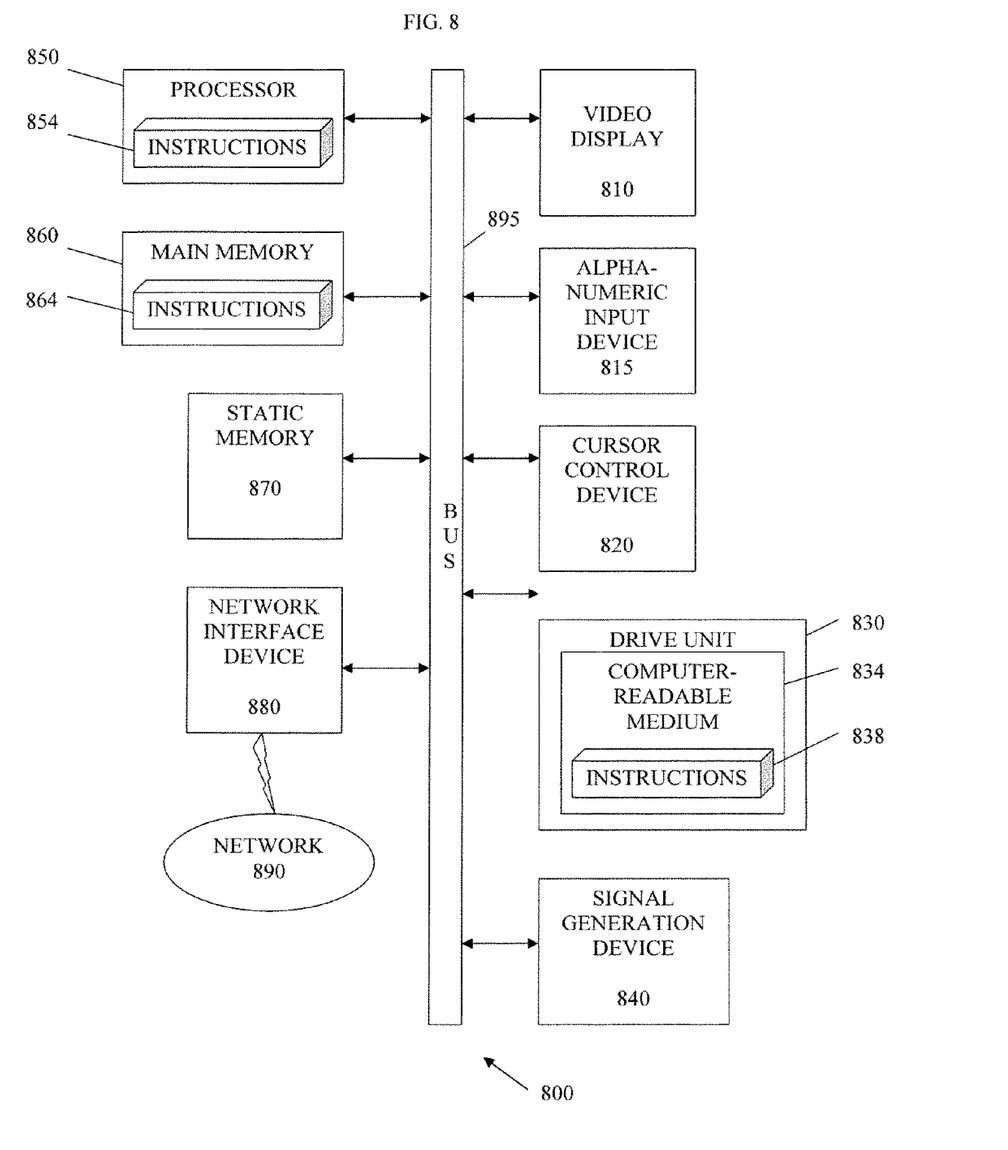
FIG. 8 is a schematic diagram of an exemplary computer system according to one embodiment of the invention.

FIG. 8 shows a diagrammatic representation of a machine in the exemplary form of computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 800 includes processor 850 (e.g., a central processing unit (CPU), a graphics processing unit (GPU) or both), main memory 860 (e.g., read only memory (ROM), flash memory, dynamic random access memory (DRAM) such as synchronous DRAM (SDRAM) or Rambus DRAM (RDRAM), etc.) and static memory 870 (e.g., flash memory, static random access memory (SRAM), etc.), which communicate with each other via bus 595.

Computer system 800 may further include video display unit 810 (e.g., a liquid crystal display (LCD) or a cathode ray tube (CRT)). Computer system 800 also includes alphanumeric input device 815 (e.g., a keyboard), cursor control device 820 (e.g., a mouse), disk drive unit 830, signal generation device 840 (e.g., a speaker), and network interface device 880.

Disk drive unit 830 includes computer-readable medium 834 on which is stored one or more sets of instructions (e.g., software 838) embodying any one or more of the methodologies or functions described herein. Software 838 may also reside, completely or at least partially, within main memory 860 and/or within processor 850 during execution thereof by computer system 800, main memory 860 and processor 850 also constituting computer-readable media. Software 838 may further be transmitted or received over network 890 via network interface device 880.

While computer-readable medium 834 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

It should be noted that the server as illustrated and discussed herein has various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

The invention is achieved by manipulating data structures and transforming the data from one form, useable by a computer for one purpose, to another form, useable by a computer for another purpose.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computer-implemented method for aggregating user data and targeting content, the method comprising:
    transmitting information associated with a plurality of quizzes to a user device associated with a user;
    receiving a selection of at least one of the plurality of quizzes and user input associated with the at least one selected quiz;
    associating a pre-existing character result with the user based on the received user input;
    aggregating user data associated with the user with a character profile associated with the character result, the character profile being based on user data from a plurality of users associated with the character result;
    analyzing the character profile to identify content associated with the character profile; and
    delivering the identified content to the user.

2. The method of claim 1, wherein the identified content includes one or more of user forums, web pages, news feeds, chat rooms, songs, advertisements, promotions, shops, and watch lists.

3. The method of claim 2, wherein the news feed is delivered to the user.

4. The method of claim 1, wherein said step of delivering comprises:
    identifying television shows that users associated with the character profile are watching;
    determining the most popular shows for the character profile; and
    delivering a list of the most popular shows to the users associated with the character profile.

5. The method of claim 1, wherein said step of delivering comprises:
    identifying common activities or interests for users associated with the character profile;
    determining the most popular activities or interests for the character profile; and
    delivering a list of the most popular activities or interests to the users associated with the character profile.

6. The method of claim 1, wherein said analyzing step comprises analyzing user profiles of other users associated with the character profile.

7. The method of claim 1, wherein said analyzing step comprises analyzing activities of other users associated with the character profile.

8. A system for aggregating user data and targeting content, the system comprising:
    a transmitting module configured to transmit information associated with a plurality of quizzes to a user device associated with a user;
    a receiving module configured to receive a selection of at least one of the plurality of quizzes and user input associated with the at least one selected quiz;
    an assignment module configured to associate a pre-existing character result with the user based on the received user input;
    an aggregation module configured to aggregate user data associated with the user with a character profile associated with the character result, the character profile being based on user data from a plurality of users associated with the character result;

an analysis module configured to analyze the character profile to identify content associated with the character profile; and a delivery module configured to deliver the identified content to the user.

9. The system of claim 8, wherein the identified content includes one or more of user forums, web pages, news feeds, chat rooms, songs, advertisements, promotions, shops, and watch lists.

10. The system of claim 9, wherein the news feed is delivered to the user.

11. The system of claim 8, wherein said delivery of the identified content to the user comprises:
identifying television shows that users associated with the character profile are watching;
determining the most popular shows for the character profile; and
delivering a list of the most popular shows to the users associated with the character profile.

12. The system of claim 8, wherein said delivery of the identified content to the user comprises:
identifying common activities or interests for users associated with the character profile;
determining the most popular activities or interests for the character profile; and
delivering a list of the most popular activities or interests to the users associated with the character profile.

13. The system of claim 8, wherein said analysis of the character profile to identify content to target to users associated with the character profile comprises analyzing user profiles of other users associated with the character profile.

14. The system of claim 8, wherein said analysis of the character profile to identify content to target to users associated with the character profile comprises analyzing activities of other users associated with the character profile.

15. At least one non-transitory computer-readable medium storing computer-readable instructions that, when executed by one or more computing devices, cause at least one of the one or more computing devices to:
transmit information associated with a plurality of quizzes to a user device associated with a user;
receive a selection of at least one of the plurality of quizzes and user input associated with the at least one selected quiz;
associate a pre-existing character result with the user based on the received user input;
aggregate user data associated with the user with a character profile associated with the character result, the character profile being based on user data from a plurality of users associated with the character result;
analyze the character profile to identify content associated with the character profile; and
deliver the identified content to the user.

16. The at least one non-transitory computer-readable medium of claim 15, wherein the identified content includes one or more of user forums, web pages, news feeds, chat rooms, songs, advertisements, promotions, shops, and watch lists.

17. The at least one non-transitory computer-readable medium of claim 16, wherein the news feed is delivered to the user.

18. The at least one non-transitory computer-readable medium of claim 15, wherein said step of delivering comprises:
identifying television shows that users associated with the character profile are watching;
determining the most popular shows for the character profile; and
delivering a list of the most popular shows to the users associated with the character profile.

19. The at least one non-transitory computer-readable medium of claim 1, wherein said step of delivering comprises:
identifying common activities or interests for users associated with the character profile;
determining the most popular activities or interests for the character profile; and
delivering a list of the most popular activities or interests to the users associated with the character profile.

20. The at least one non-transitory computer-readable medium of claim 1, wherein said analyzing step comprises analyzing user profiles of other users associated with the character profile.

21. The at least one non-transitory computer-readable medium of claim 1, wherein said analyzing step comprises analyzing activities of other users associated with the character profile.

22. The method of claim 1, wherein the at least one selected quiz is sent to the user device in response to a request received from the user.

23. The system of claim 8, wherein the at least one selected quiz is sent to the user device in response to a request received from the user.

24. The at least one non-transitory computer-readable medium of claim 15, wherein the at least one selected quiz is sent to the user device in response to a request received from the user.

* * * * *